United States Patent [19]

Kim

[11] Patent Number: 5,668,459

[45] Date of Patent: Sep. 16, 1997

[54] APPARATUS FOR GENERATING MAGNETIC FLUX OF INDUCTION MOTOR

[75] Inventor: Ho Geun Kim, Anyang, Rep. of Korea

[73] Assignee: LG Industrial Systems Co., Ltd., Seoul, Rep. of Korea

[21] Appl. No.: 642,971

[22] Filed: May 6, 1996

[51] Int. Cl.$^6$ .................................................. H02P 7/36
[52] U.S. Cl. .................................... 318/798; 318/804
[58] Field of Search ........................... 318/767, 798–802, 318/804, 810, 811

[56] References Cited

U.S. PATENT DOCUMENTS

| | | |
|---|---|---|
| 4,044,285 | 8/1977 | Plunkett et al. |
| 4,418,308 | 11/1983 | Bose .................................. 318/803 |
| 4,453,116 | 6/1984 | Bose .................................. 318/727 |

*Primary Examiner*—Bentsu Ro
*Attorney, Agent, or Firm*—Oliff & Berridge

[57] ABSTRACT

An improved apparatus for generating a magnetic flux of an induction motor, which is capable of more accurately generating a magnetic flux by operating a rotational coordinate system-based current and a phase of a magnetic flux for generating a reference magnetic flux, compensating a magnetic error value which is referred to a difference value between a reference magnetic flux and a really generated magnetic flux, which includes a stator magnetic flux generator for outputting a stator magnetic flux by operating a current of an inputted static coordinate system, a voltage of a static coordinate system, and a compensation voltage; a rotor magnetic flux generator for outputting a rotor magnetic flux by operating a current of a static coordinate system inputted to the stator magnetic flux generator and a stator magnetic flux outputted to the stator magnetic flux generator; a reference magnetic flux generator for outputting a reference magnetic flux by operating a current of an inputted rotational coordinate system and a phase of a magnetic flux; and a compensation voltage generator for generating a compensation voltage so as to compensate a magnetic flux error value which is referred to a difference value between a reference magnetic flux outputted from the reference magnetic flux generator and a rotator magnetic flux outputted form the rotor magnetic flux generator, and then for outputting to the stator magnetic flux generator.

5 Claims, 2 Drawing Sheets

APPARATUS FOR GENERATING MAGNETIC FLUX OF INDUCTION MOTOR

BACKGROUND OF THE INVENTION

1. Field of the Invention

The present invention relates to an apparatus for generating a magnetic flux of an induction motor, and particularly to an improved apparatus for generating a magnetic flux of an induction motor, which is capable of more accurately generating a magnetic flux by operating a current of a rotational coordinate system and a phase of a magnetic flux for generating a reference magnetic flux, compensating a magnetic error value which is referred to a difference value between a reference magnetic flux and a really generated magnetic flux.

2. Description of the Conventional Art

FIG. 1 shows a vector control apparatus for a conventional induction motor, which includes an encoder 20 for detecting a rotational speed $\omega r$ of an induction motor 10, a speed controller 30 for generating a reference current $I^e qs*$ of a rotational coordinate system so as to coincide a rotational speed $\omega r$ of the induction motor 10 outputted from the encoder 20 with an externally applied reference speed $\omega r*$, a rotational current controller 40 for generating voltages $V^e qs$ and $V^e ds$ of a coordinate system so as to coincide rotational coordinate system currents $I^e qs$ and $I^e ds$ of the induction motor 10 with a reference current $I^e qs*$, of the rotational coordinate system outputted from the speed controller 30 and an externally applied reference current $I^e ds*$ of the rotational coordinate system, respectively, a coordinate converter 50 for converting voltages $V^e qs$ and $V^e ds$ of a rotational coordinate system outputted from the current controller 40 in accordance with a phase $\theta e$ of a magnetic flux inputted thereto into voltages $V^s qs$ and $V^s ds$ of a static coordinate system, a two/three phase voltage converter 60 for converting two phase voltages $V^s qs$ and $V^s ds$ of a static coordinate system outputted from the coordinate converter 50 into three phase voltages Vas, Vbs, and Vcs, a PWM controller 70 for converting three phase voltages Vas, Vbs, and Vcs outputted from the two/three phase voltage converter 60 into a pulse width modulation (PWM) signal which is proper for driving the induction motor 10, a current detector 80 for detecting currents Ias and Ics flowing through the induction motor 10, a three/two current phase converter 90 for converting currents Ias and Ics outputted from the current detector 80 into two phase currents $I^s qs$ and $I^s ds$, a coordinate converter 100 for converting two phase currents $I^s qs$ and $I^s ds$ outputted from the three/two phase current converter 90 into currents $I^e qs$ and $I^e ds$ of the rotational coordinate system in accordance with a phase angle $\theta e$ of a magnetic flux inputted thereto and then outputting the converted currents of the rotational coordinate system $I^e qs$ and $I^e ds$ to the current controller 40, a magnetic flux generator 110 for generating magnetic phases $\lambda^s qr$ and $\lambda^s dr$ of a static coordinate system by operating output voltages $V^s qs$ and $V^s ds$ outputted from the coordinate converter 50 and currents $I^s qs$ and $I^s ds$ outputted from the three/two phase converter 90, a coordinate converter 120 for converting magnetic fluxes $\lambda^s qr$ and $\lambda^s dr$ of the static coordinate system outputted from the magnetic flux generator 110 into a magnetic flux $\lambda^e dr$ of a rotational coordinate system in accordance with a phase $\theta e$ of a magnetic flux inputted thereto, a slip frequency generator 130 for generating a slip frequency $\omega s1$ by operating a magnetic flux $\lambda^e dr$ outputted from the coordinate converter 120, a current $I^e qs$ outputted from the coordinate converter 100, an exciting inductance Lm of the induction motor 10, and a rotor time constant Tr, and a magnetic flux phase generator 140 for operating a rotational speed $\omega r$ of the induction motor 10 outputted from the encoder 20, and a slip frequency $\omega s1$ outputted from the slip frequency generator 130, generating a magnetic phase $\theta e$, and outputting the phase $\theta e$ to the coordinate converters 50 and 100, respectively.

The speed controller 30 includes a subtractor 31 for subtracting a rotational speed $\omega r$ of the induction motor 100 outputted from the encoder 20 from an externally applied reference speed $\omega r*$, and for outputting a rotational speed error value of the induction motor 10, and a PI controller 32 for proportionally operating and generating the error value outputted from the subtractor 31 so as to compensate the error value and for outputting a reference current $I^e qs*$ of the rotational coordinate system.

The current controller 40 includes a subtractor 41 for subtracting a current $I^e qs*$ of a rotational coordinate system outputted from the coordinate converter 100 from a reference current $I^e qs*$ of a rotational coordinate system outputted from the speed controller 30, and for outputting a current error value, a subtractor 42 for subtracting the current $I^e ds*$ of a rotational coordinate system outputted from the coordinate converter 100 from an externally applied reference current $I^e ds*$ of a rotational coordinate system, and for outputting a current error value, a PI controller 43 for proportionally operating and integrating a current error value outputted from the subtractor 41 and for outputting a voltage $V^e qs$ of a rotational coordinate system, and a PI controller 44 for proportionally operating and integrating a current error value outputted from the subtractor 42 so as to compensate a current error value and for outputting a voltage $V^e ds$ of a rotational coordinate system.

The magnetic flux phase generator 140 includes an adder 141 for adding a slip frequency $\omega s1$ outputted from the slip frequency generator 130 and a rotational speed $\omega r$ of the induction motor 10 outputted from the encoder 20, and an integrating unit 142 for integrating a frequency $\omega e$ outputted from the adder 141 and outputting a phase $\theta e$ of a magnetic flux to the coordinate converters 50 and 100, respectively.

In addition, as shown in FIG. 2, the magnetic flux generator 110 which is referred to a magnetic flux generating apparatus of a conventional induction motor includes an operation unit 111 for multiplying the current $I^s qds$ of the static coordinate system, $I^s qs$ and $I^s ds$ outputted from the three/two phase current converter 90 by an equivalent resistance Rs of a stator, an operation unit 112 for multiplying a current $I^s qds$ of a static coordinate system outputted from the three/two phase current converter 90 by a leakage inductance $L\sigma$ and for outputting a leakage magnetic flux, a subtractor 113 for subtracting a voltage outputted from the operation unit 111 from a voltage $V^s qds$ of a static coordinate system outputted from the coordinate converter 50 and for outputting a back electromotive force, an integrating unit 114 for integrating a back electromotive force outputted from the subtractor 113 and for outputting stator magnetic flux $\lambda^s qds$ of a stator coordinate system by integrating the back electromotive force outputted from the subtractor 113, a subtractor 115 for subtracting a leakage magnetic flux outputted from the operation unit 112 from a stator magnetic flux $\lambda^s qds$ of a stator coordinate system outputted from the integrating unit 114, and an operating unit 116 for multiplying a magnetic flux outputted from the subtractor 115 by a constant Lr/Lm and for outputting rotor magnetic flux $\lambda^s qdr$ of a static coordinate system.

The operation of the vector control apparatus of a conventional induction motor will now be explained with reference to the accompanying drawings.

To begin with, when the encoder 20 detects the current rotational speed ωr of the induction motor 10 during an operation of the induction motor 10, the subtractor 31 of the speed controller 30 outputs a speed error value by subtracting the current rotational speed ωr detected by the encoder 20 from an externally applied reference speed ωr*, and the PI controller 32 proportionally integrates the speed error value so as to compensate the speed error value outputted from the subtractor 31 and outputs a reference current $I^e qs*$, of the rotational coordinate system.

Thereafter, in the current controller 40, the subtractor 41 subtracts a current $I^e qs$ of a rotational coordinate system outputted from the coordinate converter 32 from a reference current $I^e qs*$ of the rotational coordinate system outputted from the PI controller 32 of the speed controller 32, and outputs a current error value, and the subtractor 42 subtracts a current $I^e ds$ of a rotational coordinate system outputted from the coordinate converter 100 from an externally applied reference current $I^e ds*$ of a rotational coordinate system, and outputs a subtracted current error value.

Thereafter, the PI controller 43 of the current controller 40 proportionally integrates a current error value so as to compensate a current error value outputted from the subtractor 41, and outputs a voltage $V^e qs$ of a rotational coordinate system, and the PI controller 44 proportionally integrates a current error value so as to compensate a current error value outputted from the subtractor 42, and outputs a voltage $V^e ds$ of a rotational coordinate system.

The coordinate converter 50 converts voltages $V^e qs$ and $V^e ds$ of a rotational coordinate system outputted from the PI controllers 43 and 43, respectively, of the current controller in accordance with a phase θe of a magnetic flux outputted from the integrating unit 142 of the magnetic flux phase operator 140, and the thusly outputted voltages $V^s qs$ and $V^s ds$ are converted into three phase voltages $V_{as}$, $V_{bs}$, and $V_{cs}$ by the two/three phase voltage converter 60.

The PWM controller 70 receives three phase voltages $V_{as}$, $V_{bs}$ and $V_{cs}$ outputted from the two/three voltage converter 60, and converts the three phase voltages $V_{as}$, $V_{bs}$ and $V_{cs}$ into a pulse width modulation signal for driving the induction motor 10.

Meanwhile, the current detector 80 detects currents Ias and Ics flowing at the induction motor 10, and the currents Ias and Ics are converted into two phase currents $I^s qs$ and $I^s ds$ of a static coordinate system by the three/two phase current converter 90.

The two phase currents $I^s qs$ and $I^s ds$ of a static coordinate system outputted from the three/two phase current converter 90 are converted into currents $I^e qs$ and $I^e ds$ of a rotational coordinate system in accordance with a phase θe of a magnetic flux outputted from the integrating unit 142 of the magnetic phase operator 140, and then applied to the subtractors and 42 of the current controller 40, respectively.

Meanwhile, the magnetic flux generator 110 which is adapted for a more accurate vector control operates a voltage $V^s qds$ of a static coordinate system outputted from the coordinate converter 50 and a current $I^s qds$ of a static coordinate system outputted from the three/two phase current converter 90, and generates a magnetic flux $λ^s qds$.

The above description will be explained in more detail.

To begin with, the current $I^s qds$ of a static coordinate system outputted from the three/two phase current converter 90 is multiplied by an expression resistance Rs of a stator by the operation unit 111, and inputted to the subtractor 113 as voltage, and the current $I^s qds$ of a static coordinate system outputted from the three/two current converter 90 is multi- plied by a leakage magnetic flux of the induction motor 10 by the operation unit 112, and inputted to the subtractor 115.

The subtractor 113 subtracts a voltage inputted thereto through the operation unit 111 from a voltage $V^s qds$ of a static coordinate system outputted from the coordinate converter 50.

Thereafter, the integrating unit 114 integrates a back electromotive force outputted from the subtractor 113, and then outputs a stator magnetic flux $λ^s qds$ of a static coordinate system, and the subtractor 115 subtracts a leakage magnetic flux outputted from the operation unit 112 from a magnetic flux $λ^s qds$ outputted from the integrating unit 114.

The operation unit 116 multiplies a magnetic flux outputted from the subtractor 115 by a constant Lr/Lm, and outputs a magnetic flux $λ^s qdr$ of a rotor.

Here, Lr denotes an inductance of a rotor, and Lm denotes an exciting inductance.

The magnetic flux generator 110 operates the voltages $V^s qs$ $V^s ds$ of a static coordinate system and currents $I^s qs$ and $I^s ds$ of a static coordinate system following the expressions (1) and (2) below, and then outputs magnetic fluxes $λ^s qr$ and $λ^s dr$.

$$λ^s qr=Lr/Lm[\int(V^s qs-RsI^s qs)dt-LσI^s qs] \quad (1)$$

$$λ^s dr=Lr/Lm[\int(V^s ds-RsI^s ds)dt-LσI^s ds] \quad (2)$$

Thereafter, the coordinate converter 120 operates magnetic fluxes $λ^s qr$ and $λ^s dr$ of a static coordinate system outputted from the magnetic flux generator 110 in accordance with a phase θe of a magnetic flux outputted from the integrating unit 142 of a magnetic flux phase generator 140 following the expression (3), and then converts into the magnetic flux $λ^e dr$ of a rotational coordinate system.

$$λ^e dr=Sin\ θe×λ^s qr+Cos\ θe×λ^s dr \quad (3)$$

Thereafter, the slip frequency generator 130 operates a magnetic flux $λ^e dr$ of a rotor outputted from the coordinate converter 120, a current $I^e qs$ outputted from the coordinate converter 100, and a constant Lm/Tr following the expression (4) below, and then outputs a slip frequency ωsl.

$$ωsl=(Lm/Tr)×(i^e qs/λ^e dr) \quad (4)$$

The slip frequency ωsl outputted from the slip frequency generator 130 is added by a rotational speed ωr of the induction motor 10 detected by the encoder 20 through the adder 141 of the magnetic flux phase generator 140, and then is outputted as an angular frequency ωe, and the thusly outputted angular frequency ωe is integrated by the integrating unit 142, and then is outputted to the coordinate converters 50 and 100 in accordance with a phase θe of a magnetic flux.

However, the magnetic flux generating apparatus of a conventional induction motor has a disadvantage in that in order to generate a magnetic flux which is expressed in the expressions (1) and (2), a purity integration is necessary, so that an inaccurate magnetic flux is generated since an integrating unit is saturated due an offset of voltage or noise of system.

SUMMARY OF THE INVENTION

Accordingly, it is an object of the present invention to provide an apparatus for generating a magnetic flux of an induction motor, which overcomes the problems encountered in a conventional apparatus for generating a magnetic flux of an induction motor.

It is another object of the present invention to provide an improved apparatus for generating a magnetic flux of an induction motor, which is capable of more accurately generating a magnetic flux by operating a rotational coordinate system-based current and a phase of a magnetic flux for generating a reference magnetic flux, compensating a magnetic error value which is referred to a difference value between a reference magnetic flux and a really generated magnetic flux.

To achieve the above objects, there is provided an apparatus for generating a magnetic flux of an induction motor, which includes a stator magnetic flux generator for outputting a stator magnetic flux by operating a current of an inputted static coordinate system, a voltage of a static coordinate system, and a compensation voltage; a rotor magnetic flux generator for outputting a rotor magnetic flux by operating a current of a static coordinate system inputted to the stator magnetic flux generator and a stator magnetic flux outputted to the stator magnetic flux generator; a reference magnetic flux generator for outputting a reference magnetic flux by operating a current of an inputted rotational coordinate system and a phase of a magnetic flux; and a compensation voltage generator for generating a compensation voltage so as to compensate a magnetic flux error value which is referred to a difference value between a reference magnetic flux outputted from the reference magnetic flux generator and a rotor magnetic flux outputted from the rotor magnetic flux generator, and then for outputting to the stator magnetic flux generator.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 3:
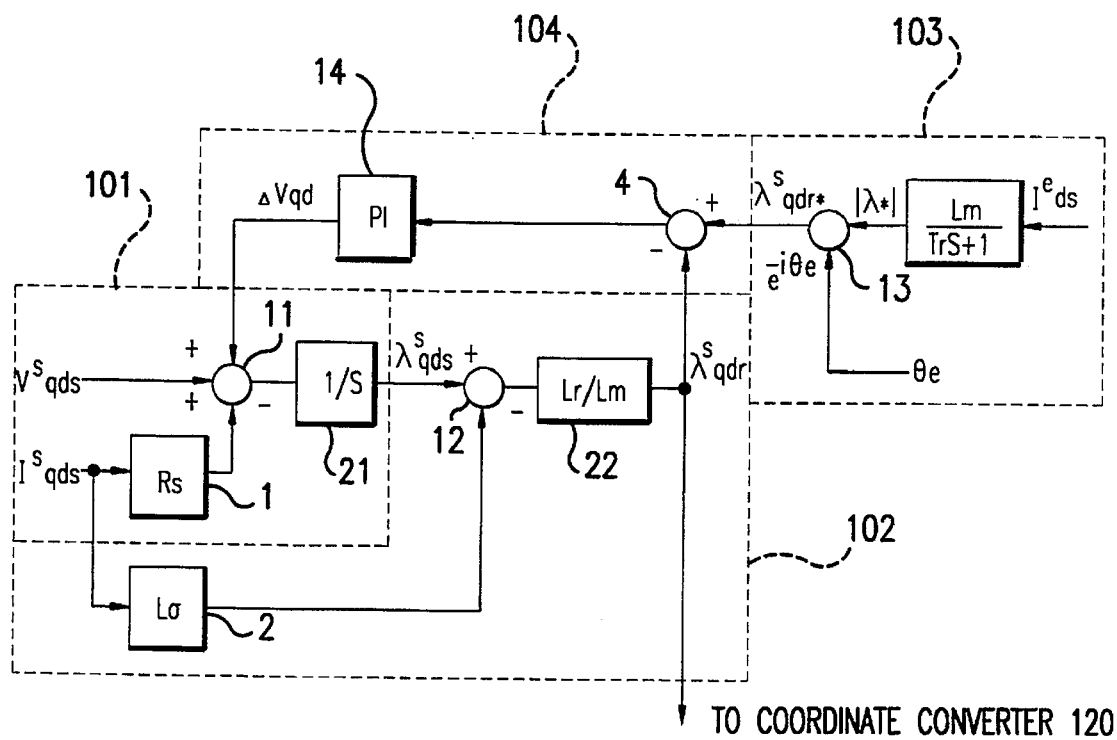
FIG. 3 is a block diagram of a magnetic flux generating apparatus for an induction motor of the present invention.

FIG. 3 shows a magnetic flux generating apparatus of an induction motor of the present invention, which includes a stator magnetic flux generator 101 for generating a current $I^s_{qds}$ of a static coordinate system, a voltage $V^s_{qds}$ of a static coordinate system, and a compensation voltage $\Delta V_{qd}$, and for generating a stator magnetic flux $\lambda^s_{qds}$, a rotor magnetic flux generator 102 for operating a current $I^s_{qds}$ of a static coordinate system, and a stator magnetic flux $\lambda^s_{qds}$ and for generating a rotor magnetic flux $\lambda^s_{qdr}$, a reference magnetic flux generator 103 for operating a current $I^e_{ds}$ of a rotational coordinate system and a phase $\theta e$ a magnetic flux and for generating a reference magnetic flux $\lambda^e_{qdr}*$, and a compensation voltage generator 104 for generating a compensation voltage $\Delta V_{qd}$ so as to compensate a magnetic flux error value which is referred to a difference value between a reference magnetic flux $\lambda^e_{qdr}*$ of the reference magnetic flux generator 103 and a rotational magnetic flux $\lambda^s_{qdr}$ of the rotor magnetic flux generator 102 and then for outputting to the stator magnetic flux generator 101.

The stator magnetic flux generator 101 includes an operation unit 1 for multiplying a current $I^s_{qds}$ of a static coordinate system by an equivalent resistance Rs of a stator and for outputting as a voltage, a subtractor 11 for adding a voltage $V^s_{qds}$ of a static coordinate system and a compensation voltage $\Delta V_{qd}$, and for subtracting a voltage outputted from the operation unit 1 from the thusly added voltage, and an integrating unit 21 for integrating voltage outputted from the subtractor 11 and for outputting a stator magnetic flux $\lambda^s_{qds}$.

The rotor magnetic flux generator 102 includes an operation unit 2 for multiplying a current $I^s_{qds}$ of a static coordinate system by a leakage inductance $L\sigma$ and for outputting a leakage magnetic flux, a subtractor 12 for subtracting a leakage magnetic flux outputted from the operation unit 2 from a stator magnetic flux $\lambda^s_{qds}$ outputted from the stator magnetic flux generator 101, and an operation unit 22 for multiplying a stator magnetic flux outputted from the subtractor 12 by a constant Lr/Lm and then for outputting a rotor magnetic flux $\lambda^s_{qdr}$.

The reference magnetic flux generator 103 includes an operation unit 3 for multiplying a current $I^e_{ds}$ of a rotational coordinate system by a predetermined operator $L_m/(T_rS+1)$ and for outputting a magnetic flux reference value $|\lambda^*|$, and a multiplier 13 for multiplying a magnetic flux reference value $|\lambda^*|$ outputted from the operation unit 3 by an inputted magnetic flux phase $\theta e$ and for outputting a reference magnetic flux $\lambda^e_{qdr}*$.

The compensation voltage generator 104 includes a subtractor 4 for subtracting a rotational magnetic flux $\lambda^s_{qdr}$ outputted from the rotor magnetic flux generator 102 from a reference magnetic flux $\lambda^s_{qdr}*$ outputted from the reference magnetic flux generator 103, and a PI controller 14 for proportionally integrating a magnetic flux error value so as to compensate a magnetic flux error value outputted from the subtractor 4 and for outputting a compensation voltage $\Delta V_{qd}$.

The operation of the magnetic flux generator of an induction motor of the present invention will now be explained with reference to the accompanying drawings.

To begin with, as shown in FIG. 3, when a current $I^s_{qds}$ of the static coordinate system outputted from the three/two phase current converter 90 is applied to the operation unit 1 of the stator magnetic flux generator 101, the operation unit 2 of the rotor magnetic flux generator 102, and the operation unit 2 of the rotor magnetic flux generator 102, respectively, the operation unit 1 multiplies the current $I^s_{qds}$ of the inputted static coordinate system by an equivalent resistance Rs of the stator, and then outputs to the subtractor 11.

Figure 1:
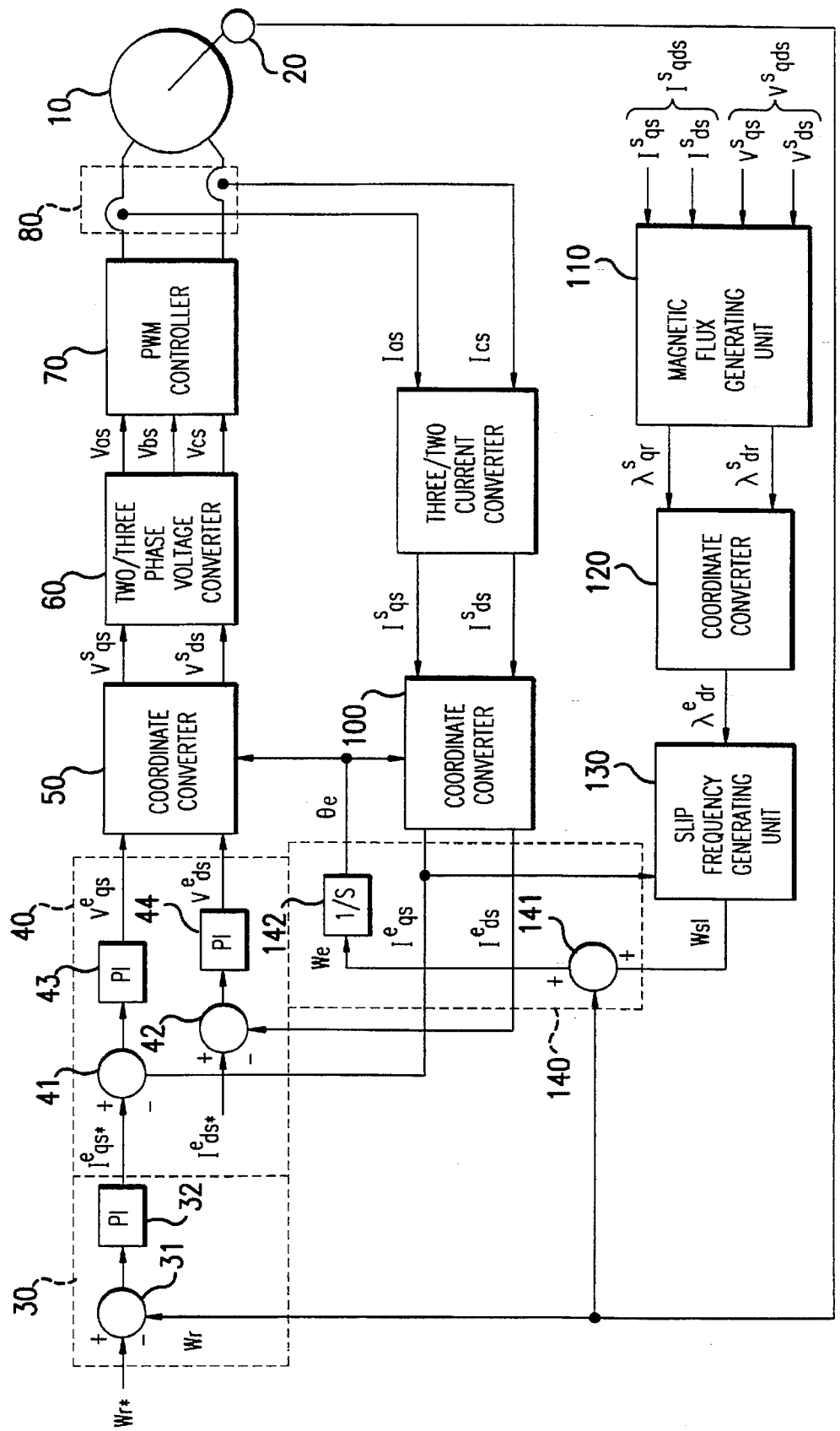
FIG. 1 is a block diagram of a conventional vector control apparatus of a conventional induction motor.
Figure 2:
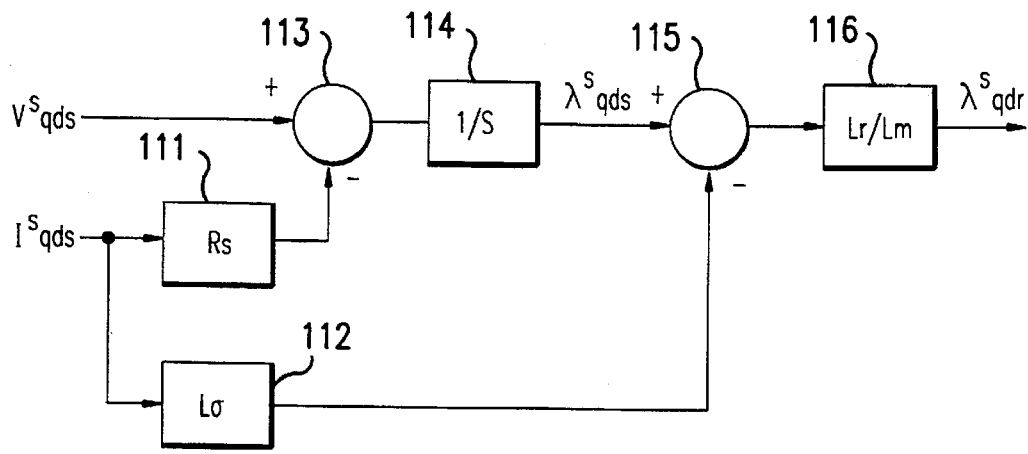
FIG. 2 is a block diagram of a magnetic flux generating unit of FIG. 1.

The subtractor 11 adds the voltage $V^s_{qds}$ of a static coordinate system outputted from the coordinate converter 50 of FIG. 1 and the compensation voltage $\Delta V_{qd}$ outputted from the PI controller 14 of the compensation voltage generator 104, subtracts a voltage outputted from the operation unit 1 from the added voltage, and applies the subtracted back electromotive force to the integrating unit 21.

The integrating unit 21 integrates the back electromotive force outputted from the subtractor 11, generates a stator magnetic flux $\lambda^s_{qds}$, and then outputs to the subtractor 12 of the rotor magnetic flux generator 102.

Meanwhile, the operation unit 2 multiplies the current $I^s_{qds}$ of the static coordinate system applied thereto from the three/two phase current converter 90 as shown in FIG. 1 by a leakage inductance $L\sigma$, and generates a leakage magnetic flux $I^s_{qds}L\sigma$, and then applies to the subtractor 12.

Thereafter, the subtractor 12 subtracts a leakage magnetic flux outputted from the operation unit 2 from the stator magnetic flux $\lambda^s_{qds}$ outputted from the integrating unit 21, and then outputs a stator magnetic flux. The thusly outputted stator magnetic flux is multiplied by a constant Lr/Lm, and then is outputted as a rotor magnetic flux $\lambda^s qdr$.

The rotor magnetic flux generator 101 operates the stator magnetic flux $\lambda^s qds$ outputted from the stator magnetic flux generator 101 and the current $I^s qds$ of a static coordinate system outputted from the three/two phase current converter 90 as shown in FIG. 1 following the expressions(5) and (6) below, and then generates a rotor magnetic flux $\lambda^s qdr$.

$$\lambda^s qr = Lr/Lm[\int(V^s qs - RsI^s qs + \Delta Vq)dt - L\sigma I^s qs] \quad (5)$$

$$\lambda^s dr = Lr/Lm[\int(V^s ds - RsI^s ds + Vd)dt - L\sigma I^s ds] \quad (6)$$

Meanwhile, the operation unit 3 of the reference magnetic flux generator 103 multiplies the current $I^r ds$ of the rotational coordinate system outputted from the coordinate converter 100 as shown in FIG. 1 by a predetermined operator Lm/(TrS+1), and outputs the thusly obtained magnetic reference value $|\lambda^*|$ to the multiplier 13.

The multiplier 13 multipliers the magnetic reference value $|\lambda^*|$ outputted from the operation unit 3 and the magnetic phase $\theta e$ outputted from an integrating unit 142 of the magnetic flux phase generator 140 as shown in FIG. 1 following the expressions (7) and (8) below, and then outputs a reference magnetic flux $\lambda^s qdr^*$.

$$\lambda^s qr^* = |\lambda^*| \sin\theta e \quad (7)$$

$$\lambda^s dr^* = |\lambda^*| \cos\theta e \quad (8)$$

Thereafter, the subtractor 4 of the compensation voltage generator 104 subtracts the rotor magnetic flux $\lambda^s qdr$ outputted from the operation unit 22 from the reference magnetic flux $\lambda^s qdr^*$ outputted from the multiplier 13, and then outputs a magnetic flux error value to the PI controller 14.

The PI controller 14 proportionally integrates the magnetic flux error value flowing the expressions (9) and (10) below so as to compensate the magnetic flux error value outputted from the subtractor 4, outputs a compensation voltage $\Delta Vqd$, and then applies to the subtractor 11 of the stator magnetic flux generator 101.

$$\Delta Vq = Kp(\lambda^s qr^* - \lambda^s qr) + Ki\int(\lambda^s qr^* - \lambda^s qr)dt \quad (9)$$

$$\Delta Vd = Kp(\lambda^s dr^* - \lambda^s dr) + Ki\int(\lambda^s dr^* - \lambda^s dr)dt \quad (10)$$

As described above, the magnetic flux generating apparatus of an induction motor of the present invention is directed to multiplying a magnetic flux reference value by a phase of a magnetic flux, generating a reference magnetic flux, generating a compensation voltage so as to compensate a magnetic error value which is referred to a difference value of a real magnetic flux between a reference magnetic flux which is not dispersed and a reference magnetic flux which is to be dispersed in accordance with an off-setting, feed-backing the process which is directed to generating a real magnetic flux, and generating a more accurate real magnetic flux, thus performing an accurate and stable vector control.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An apparatus for generating a magnetic flux of an induction motor, comprising:

stator magnetic flux generating means for outputting a stator magnetic flux by operating a current of an inputted static coordinate system, a voltage of the static coordinate system, and a compensation voltage;

rotor magnetic flux generating means for outputting a rotor magnetic flux by operating the current of the static coordinate system inputted to the stator magnetic flux generating means and the stator magnetic flux outputted from the stator magnetic flux generating means;

reference magnetic flux generating means for outputting a reference magnetic flux by operating a current of an inputted rotational coordinate system and a phase of the magnetic flux; and compensation voltage generating means for generating a compensation voltage so as to compensate a magnetic flux error value which is referred to a difference value between a reference magnetic flux outputted from the reference magnetic flux generating means and the rotor magnetic flux outputted from the rotor magnetic flux generating means, and then for outputting to the stator magnetic flux generating means.

2. The apparatus of claim 1, wherein said stator magnetic flux generating means includes:

an operation unit for multiplying the current of the inputted static coordinate system by an equivalent resistance of a stator, and then outputting as a voltage;

a subtractor for adding the voltage of the inputted static coordinate system and the compensation voltage outputted from the compensation voltage generating means and for subtracting the voltage outputted from the operation unit from the added voltage; and an integrating unit for integrating the voltage outputted from the subtractor and for outputting the stator magnetic flux.

3. The apparatus of claim 1, wherein said rotor magnetic flux generating means includes:

a first operation unit for multiplying the current of the inputted static coordinate system by a leakage inductance of the induction motor and for outputting a leakage magnetic flux;

a subcontractor for subtracting the leakage magnetic flux outputted from the first operation unit from the stator magnetic flux outputted from the stator magnetic flux generating means; and a second operation unit for multiplying a stator magnetic flux outputted from the subtractor by a predetermined constant and for outputting the rotor magnetic flux.

4. The apparatus of claim 1, wherein said reference magnetic flux generating means includes:

an operation unit for multiplying the current the inputted rotational coordinate system by a predetermined operator and for outputting a magnetic flux reference value; and a multiplier for multiplying the magnetic flux reference value outputted from the operation unit by the inputted magnetic flux phase and for outputting the reference magnetic flux.

5. The apparatus of claim 1, wherein said compensation voltage generating means includes:

a subtractor for subtracting the rotor magnetic flux outputted from the rotor magnetic generating means from the reference magnetic flux outputted from the reference magnetic generating means and for outputting the magnetic flux error value; and a PI controller for proportionally integrating the magnetic flux error value so as to compensate the magnetic flux error value outputted from the subtractor and for outputting the compensation voltage.

* * * * *

UNITED STATES PATENT AND TRADEMARK OFFICE
CERTIFICATE OF CORRECTION

PATENT NO. : 5,668,459
DATED : September 16, 1997
INVENTOR(S) : Ho Geun Kim

It is certified that error appears in the above-identified patent and that said Letters Patent is hereby corrected as shown below:

Title page, item [30], Foreign Application Priority Data should read--
May (, 1995 [KP] Korea.........11271--.

Signed and Sealed this

Tenth Day of March, 1998

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,668,459

DATED : September 16, 1997

INVENTOR(S) : Ho Geun Kim

It is certified that error appears in the above-identified patent and that said Letters Patent is hereby corrected as shown below:

Title page, item [30], Foreign Application Priority Data should read --May 9, 1995 [KP] Korea.........11271 --.

This certificate supersedes Certificate of Correction issued March 10, 1998.

Signed and Sealed this

Seventh Day of July, 1998

*Attest:*

BRUCE LEHMAN

*Attesting Officer*     *Commissioner of Patents and Trademarks*